(12) United States Patent
Luttmann et al.

(10) Patent No.: US 9,354,898 B1
(45) Date of Patent: May 31, 2016

(54) DETECTION OF A USB OS DESCRIPTOR REQUEST TO FACILITATE INSTALLATION OF A DEVICE DRIVER

(75) Inventors: Eric J. Luttmann, Eagle, ID (US); Kevin Thompson, Meridian, ID (US); David Watkins, Eagle, ID (US)

(73) Assignee: Marvell International Ltd., Hamilton (BM)

( * ) Notice: Subject to any disclaimer, the term of this patent is extended or adjusted under 35 U.S.C. 154(b) by 1994 days.

(21) Appl. No.: 12/501,270

(22) Filed: Jul. 10, 2009

Related U.S. Application Data

(60) Provisional application No. 61/082,384, filed on Jul. 21, 2008.

(51) Int. Cl.
*G06F 3/00* (2006.01)
*G06F 9/44* (2006.01)

(52) U.S. Cl.
CPC .................................. *G06F 9/4415* (2013.01)

(58) Field of Classification Search
USPC .................................. 719/321, 322, 323, 324
See application file for complete search history.

(56) References Cited

U.S. PATENT DOCUMENTS

| | | | |
|---|---|---|---|
| 6,012,103 A * | 1/2000 | Sartore et al. ...................... | 710/8 |
| 6,236,462 B1 | 5/2001 | Terasaka | |
| 6,754,725 B1 * | 6/2004 | Wright et al. ...................... | 710/8 |
| 6,804,727 B1 * | 10/2004 | Rademacher ...................... | 710/9 |
| 6,898,653 B2 | 5/2005 | Su et al. | |
| 7,213,044 B2 * | 5/2007 | Tjong et a ...................... | 709/200 |
| 7,237,101 B1 | 6/2007 | Dono et al. | |
| 7,607,749 B2 | 10/2009 | Tabata et al. | |
| 7,668,986 B2 | 2/2010 | Lowe et al. | |
| 2002/0073256 A1 | 6/2002 | Nakamura et al. | |
| 2003/0048473 A1 | 3/2003 | Rosen | |
| 2003/0184784 A1 | 10/2003 | Ferlitsch | |
| 2005/0162675 A1 | 7/2005 | Ferlitsch | |
| 2005/0182822 A1 | 8/2005 | Daniel et al. | |
| 2006/0031632 A1 | 2/2006 | Moran et al. | |
| 2007/0053334 A1 | 3/2007 | Sueyoshi et al. | |
| 2007/0079065 A1 | 4/2007 | Bonella et al. | |
| 2007/0299650 A1 | 12/2007 | Tamayo et al. | |
| 2008/0055640 A1 | 3/2008 | Takahashi et al. | |
| 2008/0115071 A1 | 5/2008 | Fair | |
| 2008/0168188 A1 | 7/2008 | Yue et al. | |
| 2008/0195768 A1 | 8/2008 | Lowe et al. | |
| 2008/0276012 A1 * | 11/2008 | Mesa et al. ...................... | 710/13 |
| 2010/0023777 A1 | 1/2010 | Prevost et al. | |
| 2010/0146279 A1 | 6/2010 | Lu et al. | |

(Continued)

OTHER PUBLICATIONS

Johnson, D., Rice University, Perkins, C., Nokia Research Center, Arkko, J., Ericsson, "Mobility Support in IPv6-rfc3775", Jun. 2004, pp. 1-147.

Kaufman, C., "Internet Key Exchange (IKEv2) Protocol—rfc4306", Dec. 2005, pp. 1-89.

(Continued)

*Primary Examiner* — Emerson Puente
*Assistant Examiner* — Willy W Huaracha

(57) ABSTRACT

A method that includes coupling a first device to a client device using a universal serial bus (USB) link, and detecting, by the first device, a USB operating system (OS) descriptor request made by the client device. The method further includes reporting, by the first device, a mass storage interface to the client device in response to a detected USB OS descriptor request, and using the mass storage interface to install, in the client device, a device driver associated with the first device.

13 Claims, 3 Drawing Sheets

(56) References Cited

U.S. PATENT DOCUMENTS

2010/0174834 A1 7/2010 Lowe et al.
2011/0179204 A1 7/2011 Hulbert et al.

OTHER PUBLICATIONS

Devarapalli, V., Azaire Networks, Dupont, F., Celar, "Mobile IPv6 Operation with IKEv2 and the Revised IPsec Architecture-rfc4877", Apr. 2007, pp. 1-24.

Muhanna, A., Khalil, M., Nortell, Gundavelli, S., Cisco, Chowdhury, K., Starnet Networks, Yegani, P., Binding Revocation for IPv6 Mobility draft-muhanna-mip6-binding-revocation-02.txt, Nov. 19, 2007, pp. 1-20.

Soliman, Hesham and Elevate Technologies, "Mobile IPv6 support for dual stack Hosts and Routers (MSMIPv6) draft-ietf-mip6-nemo-v4traversal-06.txt", Nov. 2007, pp. 1-27.

U.S. Appl. No. 12/398,508, filed Mar. 5, 2009.

* cited by examiner

DETECTION OF A USB OS DESCRIPTOR REQUEST TO FACILITATE INSTALLATION OF A DEVICE DRIVER

CROSS REFERENCE TO RELATED APPLICATIONS

The present application claims priority to U.S. Patent Application No. 61/082,384 filed Jul. 21, 2008, the entire specification of which is hereby incorporated by reference its entirety for all purposes, except for those sections, if any, that are inconsistent with this specification.

TECHNICAL FIELD

Embodiments of the present invention relate to installation of a device driver to a client device.

BACKGROUND

A client device, for example, a desktop computer, a laptop, a server, and the like, may be operatively coupled to a service device, including but not limited to a printer, a copier, a fax machine, a webcam, a television, a set-top box, a camera, or any other appropriate type of appliance or peripheral, that may provide one or more services to the client device. The service device may be operatively coupled to the client device through an appropriate link, e.g., a universal serial bus (USB) link, a wired or wireless network connection, a Bluetooth connection, a serial port connection, a parallel port connection, and the like.

In order to fully utilize the functionalities of the service device, an appropriate driver, generally in the form of software, typically needs to be loaded, installed, and configured in the client device, as is well known in the art. For example, if the service device is a printer, a printer driver of appropriate type may need to be installed and configured in the client device to enable the client device to access and print via the printer.

As is known in the art, a driver suitable for the service device may be available to the client device for loading and installation, for example, in an appropriate external storage device, e.g., a CD ROM, a flash drive, etc. Alternatively, the client device may also access the driver from an external server (e.g., a print server, if the service device is a printer), and/or over a network (e.g., using the Internet or an intranet, from a website of the manufacturer or seller of the service device, etc.).

Thus, in addition to having access to the service device, the client device or a user of the client device may further need access to the appropriate driver. Often, the user of the client device may not have access to the driver and/or may not be sure about the appropriate driver to be installed. Installing the driver from an external storage, an external server or over a network may also be confusing to the user of the client device, as many different types drivers (e.g., if service device is a printer, different printer drivers for different types of printers) may be available, from which the user may have to select the correct driver.

Put differently, it may be difficult and/or confusing for a user of the client device to obtain the service device driver. At the least, scouting for a device driver may negatively impact a user's experience, perception and/or satisfaction with respect to the service device.

SUMMARY

In various embodiments, the present disclosure provides a method that includes coupling a first device to a client device using a universal serial bus (USB) link, and detecting, by the first device, a USB operating system (OS) descriptor request made by the client device. The method further includes reporting, by the first device, a mass storage interface to the client device in response to a detected USB OS descriptor request, and using the mass storage interface to install, in the client device, a device driver associated with the first device.

The present disclosure also provides a service device that includes a processor configured to detect a universal serial bus (USB) operating system (OS) descriptor request made by a client device upon coupling the service device to the client device via a USB link, where the processor is further configured to report a mass storage interface in response to a detected USB OS descriptor request. The service device also includes a storage drive storing an installer program and a device driver, and the mass storage interface, wherein the mass storage interface is configured to enumerate the storage drive to the client device in response to the device being initially coupled to the client device for a first time. The installer program is configured to execute in response to the storage drive being enumerated, detected and auto-launched by the client device. The installer program is further configured to install the device driver in the client device in response to being auto-launched.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase at least one of A, B and C" means (A), (B), (C), (A and B), (A and C), (B and C) or (A, B and C). The phrase "(A) B" means (B) or (A and B), that is, A is optional.

Figure 1:
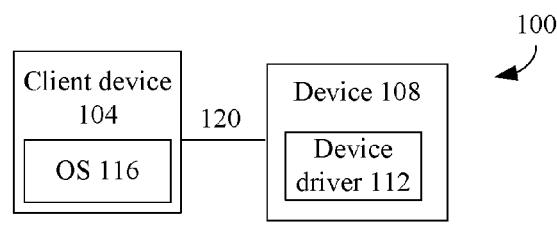
FIG. 1 schematically illustrates an exemplary system that includes a client device operatively coupled to a device through a link.

FIG. 1 schematically illustrates an exemplary system 100 that includes a client device 104 operatively coupled to a device 108 through a link 120. The client device 104 may be, for example, a desktop computer, a laptop, a server, and the like, and may operate with an appropriate type of operating system (OS) 116, e.g., Microsoft Windows®, Macintosh®, Linux®, etc. The device 108 generally may be a service providing device such as, for example, a printer (e.g., a color printer, a monochrome printer, a multifunction printer that includes additional capabilities like scanning, faxing, copying, etc.), a fax machine, a copier, a scanner, a webcam, a camera, a television, or any other appropriate type of peripheral, appliance and/or a service providing device, and may have capability to communicate with the client device 104 and possibly provide one or more services to the client device 104. For example, if the device 108 is a printer, the client device 104 may utilize printing services offered by the device 108 by printing image data on the device 108.

As shown in FIG. 1, the client device 104 is operatively coupled to the device 108 through a link 120. The link 120 may be of any appropriate type, including but not limited to a USB link, a wired or wireless network connection (e.g., a home or corporate network, an intranet, the Internet, a local area network (LAN), a wide area network (WAN), etc.), a Bluetooth connection, a serial port connection, a parallel port connection, and the like.

The device 108 also includes a device driver (or drivers) 112 that is appropriate for the device 108, stored as firmware, software or embedded software in device 108. For example, if the device 108 is a printer, the device driver 112 may be a print driver appropriate for the printer 108. In various embodiments, although not illustrated in FIG. 1, the device 108 may include a storage unit (e.g., a read only memory (ROM), a flash memory, or any other appropriate type of memory), and the device driver 112 may be stored in such storage unit.

In various embodiments, a manufacturer or seller may upload the driver 112 in the device 108 during manufacturing or selling of the device 108. In various other embodiments, the device 108 may download the device driver 112, for example, from the manufacturer's website (or from a server, e.g., a print server) over a network (not illustrated in FIG. 1). Other ways of including the driver 112 in the device 108 may also be envisioned by those skilled in the art (e.g., a system administrator or a user may upload the driver 112, from an external storage device, to the device 108).

The device 108 may also include several components (not illustrated in FIG. 1) that are well known to those skilled in the art. For example, if the device 108 is a printer, then the device 108 may also include appropriate components required for printing, as is well known to those skilled in the art.

In order for the client device 104 to utilize the functionalities of the device 108, an appropriate driver software of the device 108 generally needs to be loaded, installed, and configured in the client device 104. Accordingly, the device 108 may install the device driver 112 in the client device 104. Subsequent to installation of the device driver 112, the client device 104 can effectively communicate with the device 108 and/or utilize one or more services offered by the device 108 (e.g., print a page if device 108 is a printer, download photos or videos if device 108 is a camera or a webcam, change a television channel if device 108 is a television, configure the device 108 from the client device 104, etc.).

Figure 2:
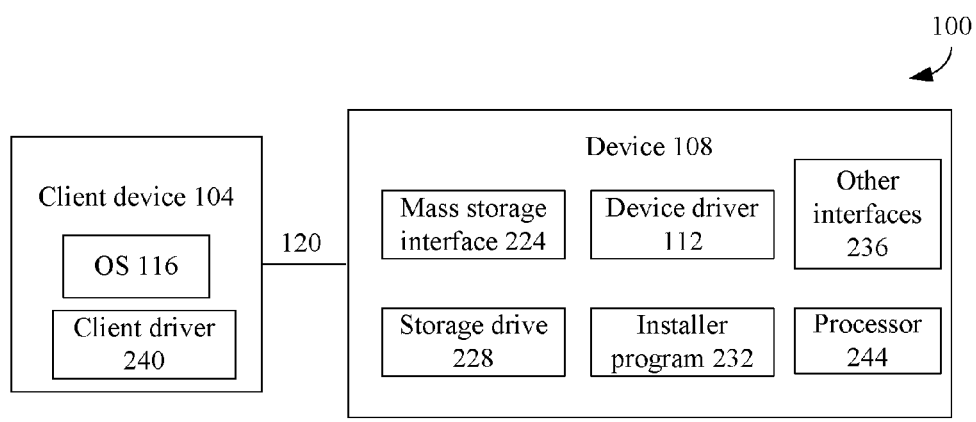
FIG. 2 schematically illustrates the exemplary system of FIG. 1 in more detail.

FIG. 2 schematically illustrates the exemplary system 100 of FIG. 1 in more detail. More specifically, FIG. 2 illustrates in more detail various components of the device 108. The device 108 includes, apart from the previously discussed device driver 112, a mass storage interface 224, a storage drive 228, an installer program 232, one or more other interfaces 236 and a processor 244. As will be readily understood by those skilled in the art, some or all the components illustrated in device 108 may be combined. For example, although the device driver 112 and the installer program 232 are illustrated as separate components, in some embodiments, the installer program 232 may be a part of the device driver 112.

The storage drive 228 may be any type of suitable storage device or arrangement, either physical or virtual. Storage drive 228 may be realized in part or in whole as firmware and/or embedded software. In various embodiments, the storage drive 228 is a virtual storage drive, such as, for example, a virtual compact disc (CD) drive that is configured to emulate a real CD drive during an operation of the device 108. Thus, although the client device 104 may detect the presence of a virtual CD drive, the client device 104 may not be aware that the virtual CD drive is a "virtual" drive. That is, the client device 104 may assume the virtual CD drive to be a regular CD drive (as virtual CD drives may be configured to emulate a regular CD drive). Virtual CD drives are well known to those skilled in the art.

In various embodiments, the installer program 232 and/or device driver 112 is stored in the storage drive 228. In various other embodiments, the storage drive 228 includes a pointer to the installer program 232. Thus, the installer program 232 and/or device driver 112 may be stored in the storage drive 228 and/or in any other appropriate storage element (not illustrated in FIG. 2) in the device 108. In various embodiments, the installer program 232, when executed (possibly by the OS 116), is configured to cause the device driver 112 to be installed in the client device 104, as will be discussed in more detail herein later.

One or more other interfaces 236 may be any interface (other than the mass storage interface 224) necessary and appropriate for proper operation of the device 108. For example, in various embodiments, if the device 108 is a printer, the interface 236 is a print interface.

As is well known to those skilled in the art, an enumeration process involves discovering, by a host, a USB device and/or several properties of the USB device through exchange of signals between the host and the USB device once the host and the USB device are operatively coupled, and may also involve assignment of an address to the USB device and/or configuration of the USB device by the host.

More particularly, in accordance with various embodiments, the OS 116 checks to see if the device 108 supports a USB OS descriptor the first time the device 108 is enumerated upon being coupled to the client device 104 via the USB link 120. The OS 116 performs this check via a USB OS descriptor request to the device 108. In particular, when the device 108 is attached to the client device 104 for the first time, the OS 116 system requests the USB OS descriptor that is located in firmware at a fixed string index of 0xEE. The USB OS descriptor contains an embedded signature field that the OS 116 uses to differentiate it from other strings that might be at index 0xEE. The presence of the USB OS descriptor that contains the proper signature field at index 0xEE indicates to the OS 116 that the device supports USB OS descriptors.

After completing the initial steps of enumeration, the OS 116 creates a unique registry entry for the newly encountered device 108. The next time the device 108 is enumerated, the OS 116 will find the registry entry and bypass any further USB OS descriptor requests for the device 108.

In one embodiment, once coupled to the client device 104, the device 108 checks for a USB OS descriptor request from the device 104. If a USB OS descriptor request is detected, the device 108 only reports the mass storage interface 224 to the client device 104. The mass storage interface 224 is used to install the device driver 112 on client device 104 to provide client driver (or drivers) 240 on client device 104. Any other USB interfaces 236 are not reported to the client device 104 at this time. Once the device driver 112 is installed on client device 104, the installer program 232 causes the device 108 to operatively de-couple from the client device 104 and then operatively re-couple to the client device 104. Alternatively, the client device 104 may control the operatively de-coupling and re-coupling of the client device 104 and the device 108 via, for example, the installed client driver 240.

When the device 108 is coupled to the client device 104 and the device 108 reports the mass storage interface 224 to the client device 104, the client device 104 may view the device 108 as a mass storage device. The client device may then detect the presence of the storage drive 228 in the device 108.

As previously discussed, the client device 104 may operate on an appropriate OS 116, e.g., Microsoft Windows® operating system. As is well known to those skilled in the art, if an operating system (e.g., Windows XP®, Windows Vista®, etc.) in a client device detects a storage drive in a device coupled to the client device over a USB link, the operating system may launch an auto-play program that is configured to auto-launch the storage drive. Thus, in various embodiments, OS 116 of the client device 104 detects the storage drive 228 in the device 108 whenever the device 108 is coupled to the client device 104 for the first time, and the OS 116 executes an auto-play program that may be configured to auto-launch the storage drive 228. As is well known to those skilled in the art, such auto-play program and/or auto-launching of the storage drive 228 causes a dialog box (e.g., an auto-play prompt) and/or other visual indication to appear in a display screen of the client device 104. Thus, with the auto-launch of the storage drive 228, the storage drive 228 may be operatively mounted in the client device 104.

As previously discussed, the storage drive 228 in the client device 104 includes the installer program 232 (or a pointer to the installer program 232). Thus, once the client device 104 auto-launches the storage drive 228, the installer program 232 may be executed (possibly after being loaded in the client device 104), which causes the device driver 112 to be installed in the client device 104 as client driver 240. Thus, the device 108 may install the client driver 240 in the client device 104, and the client device 104 may then utilize one or more services offered by the device 108.

After the client driver 240 has been installed in the client device 104, the device 108 may be operatively decoupled from the client device 104 (e.g., the link 120 may be physically disconnected from the device 108 and/or the client device 104, the device 108 may be operatively dropped from a USB bus, etc.) for any reason, and operatively coupled once again. Alternatively, the client device 104 and/or the device 108 may be switched off, and then switched back on once again. For the purpose of this disclosure and unless otherwise stated, in various embodiments, any such events occurring after the successful installation of the client driver 240 in the client device 104 is referred to as re-coupling the client device 104 and the device 108. Put differently, in various embodiments, operatively re-coupling refers to, for example, operatively disconnecting and re-connecting the device 108 to the client device 104 subsequent to the successful installation of the client driver 240. Alternatively, in various embodiments, operatively re-coupling also refers to switching off and then on the client device 104 and/or the device 108 subsequent to the successful installation of the client driver 240.

In accordance with various embodiments, once the device 108 and client device 104 are operatively re-coupled, a second enumeration process is performed. During the second enumeration and any future subsequent enumerations, the OS 116 does not request any USB OS descriptors from the device 108. This is due to the existence of the registry entry for device 108 created by the OS 116 during the initial enumeration. During the second enumeration, and any future subsequent enumerations, the device 108 reports all USB interfaces, including mass storage interface 224 and any other interfaces 236, to the client device 104. In accordance with various embodiments, during the second enumeration, and any other future enumerations, the device 108 does not report the mass storage interface 224 to the client device 104 and only reports any other interfaces 236 that may be present within device 108 and thus, may prevent detection of the storage drive 228 by the client device 104 upon operatively re-coupling the device 108 to the client device 104.

In accordance with various embodiments, the installer program 232 is configured to prevent detection of the storage drive 228 by the client device 104 upon operatively re-coupling the device 108 to the client device 104. In accordance with various embodiments, if storage drive 228 is detected by the client device 104 upon operatively re-coupling the device 108 to the client device 104, the OS 116 detects that the client driver 240 has previously been installed on the client device 104 and therefore ignores the storage drive 228 and/or the installer program 232. Additionally, in such a scenario, the OS 116 does not launch an auto-launching programs of its own due to the existence of the registry entry for device 108 created by the OS 116 during the initial enumeration of the device 108 and/or because the OS 116 detects that the client driver 240 has already been previously installed on the client device 104.

Figure 3:
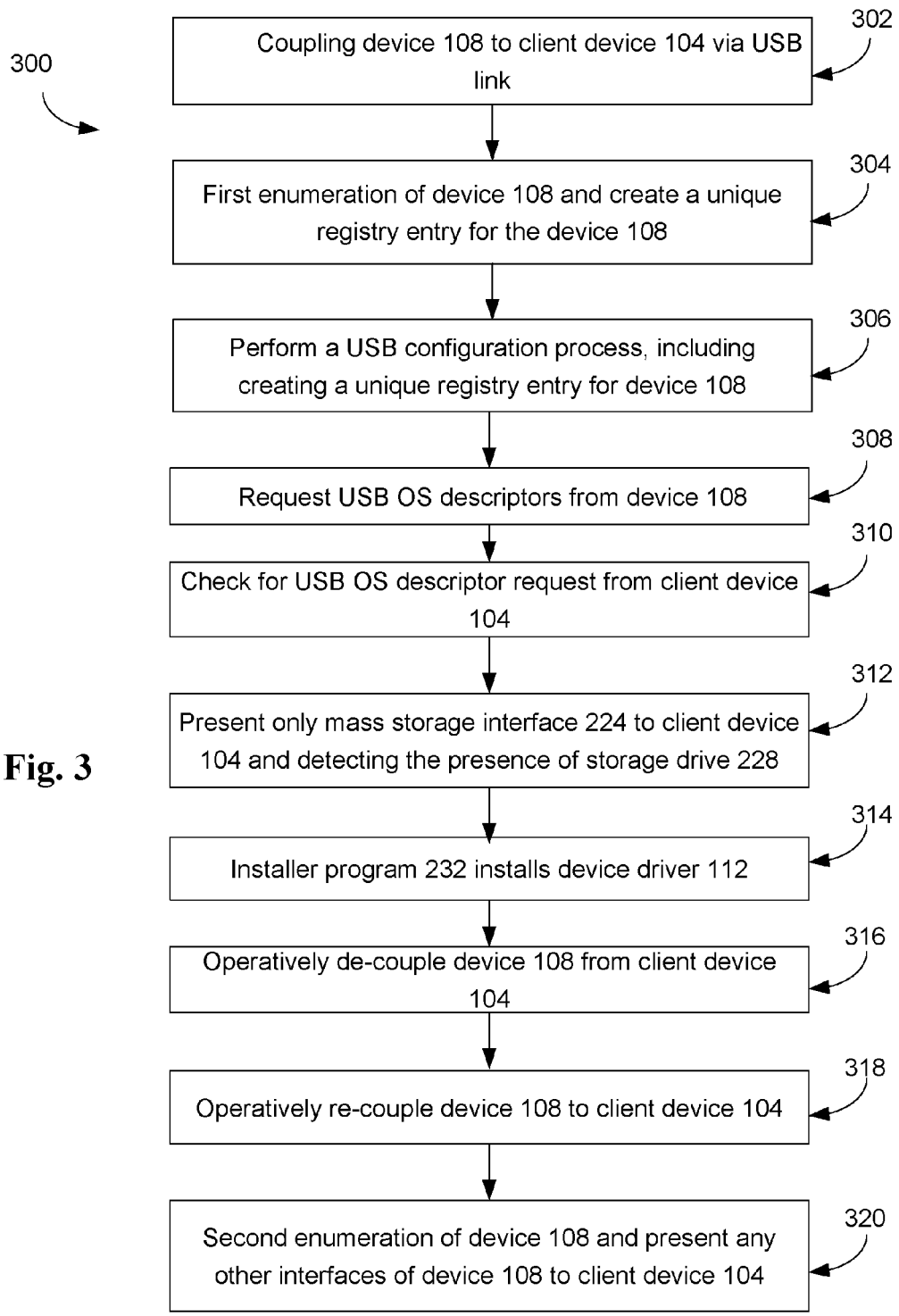
FIG. 3 illustrates an exemplary method for installing a client driver in the client device of FIG. 2.

FIG. 3 illustrates a method 300 of installing a device driver (e.g., device driver 112) in a client device (e.g., client device 104). At 302 and 304, device 108 is coupled to client device 104 via USB link 120 and the device 108 is first enumerated to the client device 104. The first enumeration process may more particularly include performing a USB configuration process at 306 after coupling the device 108 to the client device 104, which includes the OS 116 creating a unique registry entry for the newly encountered device 108. The client device 104 requests, at 308, USB OS descriptors from the device 108. At 310, the device 108 checks for the USB OS descriptor request from the client device 104 and, when detected, presents only the mass storage interface 224 to the client device 104, at 312. The device 108 is registered by the client device 104 as a mass storage device, which includes detecting the presence of the storage drive 228 in the device 108.

At 314, the installer program 232 installs the driver 112 from storage drive 228, which then become the client driver 240 on client device 104. Upon completion, the installer program 232 causes the device 108 to operatively de-couple the device 108 from client device 104, at 316. The installer program 232 then causes the device 108 to operatively re-couple to client device 104 and begin a second enumeration process at 318. During the second enumeration process, due to the presence of the registry entry for the device 108, client device 104 does not make a request for USB OS descriptors from device 108. The device 108 will therefore present any other interfaces 236 present within device 108 to the client device 104, and may also present mass storage interface 224 to client device 104.

Thus, a process in accordance with various embodiments described herein facilitates prevention of automatic installation, by the client device 104, of the device driver 112 from device 108 to client device 104 in order to become client driver 240. The device 108 controls and automatically installs the device driver 112 to client device 104.

In accordance with various embodiments, if the OS 116 of the client device 104 does not attempt to auto-install the device 108, then the installer program 232 may prompt the user of the client device to access the storage drive 228 to access the storage drive 228 and thus, manually install the driver 112 as the client driver 240.

Figure 4:
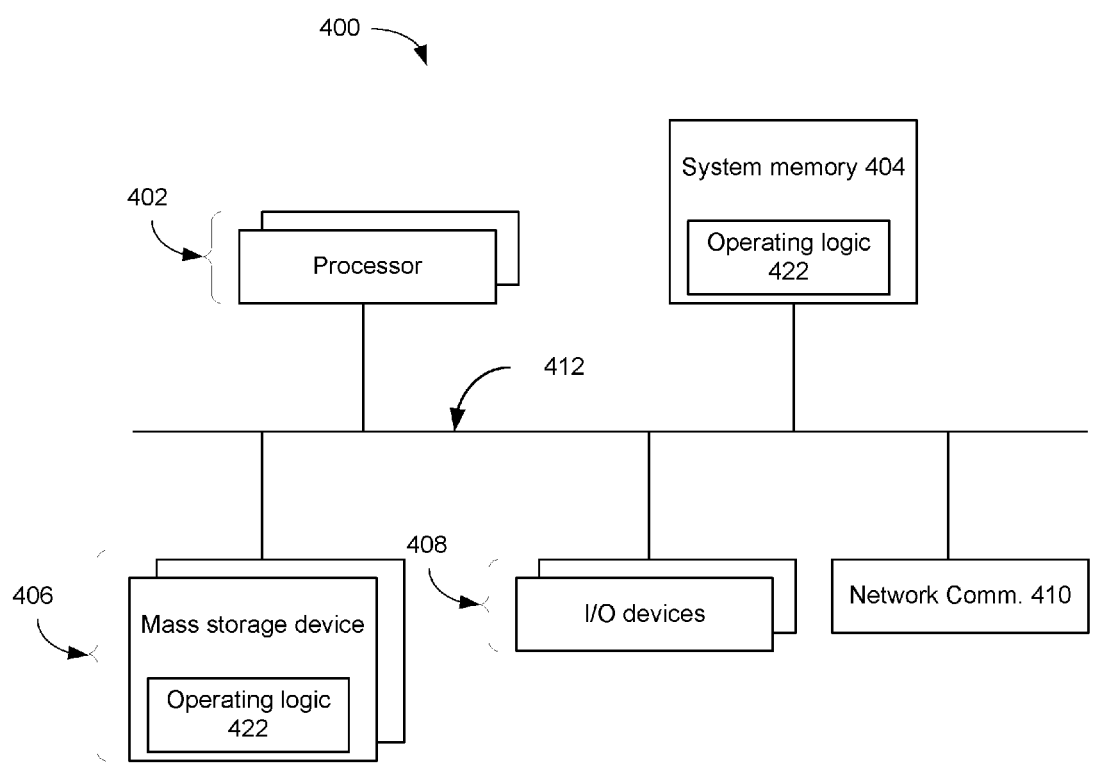
FIG. 4 is a block diagram of an exemplary system suitable for use to practice the present invention.

FIG. 4 is a block diagram of an exemplary system 400 suitable for use to practice the present invention. As illustrated, system 400 includes one or more processors or processor cores 402, and system memory 404. For the purpose of this application, including the claims, the terms "processor" and "processor cores" may be considered synonymous, unless the context clearly requires otherwise. Additionally, system 400 includes mass storage devices 406 (such as diskette, hard drive, compact disc read only memory (CDROM) and so forth), input/output devices 408 and communication interfaces 410 (such as network interface cards, modems and so forth). The elements of FIG. 4 are coupled to each other via system bus 412, which may represent one or more buses. In the case of multiple buses, the multiple buses may be bridged by one or more bus bridges (not illustrated).

Each of these elements performs its conventional functions known in the art. In particular, system memory 404 and mass storage 406 may be employed to store a working copy and a permanent copy of the programming instructions implementing all or a portion of earlier described functions, herein collectively denoted as 422. The instructions 422 may be assembler instructions supported by processor(s) 402 or instructions that can be compiled from high level languages, such as C.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having instructions 422 may be employed to distribute the instructions 422 and program various client devices. The constitution of these elements 402-412 are generally well known, and accordingly will not be further described.

In various embodiments, the system 400 is configured to operate as the client device 104 of FIGS. 1 and 2. In various embodiments, a Microsoft Windows® operating system (e.g., Windows XP, Vista, etc.) is installed on the system 400. The system 400 may further be configured to be coupled to the device 108 through USB link 120. One or more instructions stored in the system memory 404 and/or storage device 406 may cause the system 400 to enumerate the device 108, detect the presence of the storage drive 228, and cause the device 108 to install the client driver 240 in the system 400. In various embodiments, one or more instructions associated with the client driver 240 are stored in the system memory 404 and/or storage device 406.

In various embodiments, the system 400 is configured to operate as the device 108 of FIGS. 1 and 2, and includes several components, such as storage units (e.g., system memory 404 and/or storage device 406) to store one or more instructions associated with the device driver 112 and/or the installer program 232, the mass storage interface 224, storage drive 228, one or more other interfaces 236 (e.g., a print interface), and one or more other components not illustrated in FIG. 1, 2 or 4 (e.g., a printing mechanism). The system 400 may be configured to be coupled to the client device 104 and provide one or more services to the client device 104. The system 400 may also be configured to install the client driver 240 in the client device 104 the first time the client device 104 is coupled to the device 108. One or more instructions (e.g., instructions 422) stored in the system memory 404 and/or storage device 406 may facilitate one or more operations of the system 400.

Although specific embodiments have been illustrated and described herein, a wide variety of alternate and/or equivalent implementations may be substituted for the specific embodiment illustrated and described without departing from the scope of the present invention. This present invention covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the invention be limited only by the claims and the equivalents thereof.

What is claimed is:

1. A method comprising:
    coupling a first device to a client device using a universal serial bus (USB) link;
    in response to coupling the first device to the client device using the USB link, detecting, by the first device, a USB operating system (OS) descriptor request made by the client device;
    in response to detecting the USB OS descriptor request, reporting, by the first device, a mass storage interface to the client device;
    using the mass storage interface to install, in the client device, a device driver associated with the first device;
    subsequent to the installation of the device driver in the client device, operatively de-coupling the first device from the client device;
    subsequent to operatively de-coupling the first device from the client device, operatively re-coupling the first device to the client device; and
    in response to a lack of a USB OS descriptor request from the client device to the first device subsequent to operatively re-coupling the first device to the client device, reporting, by the first device, all interfaces of the first device other than the mass storage interface to the client device.

2. The method of claim 1, further comprising:
    preventing installation of the device driver subsequent to the first device being operatively re-coupled to the client device.

3. The method of claim 1, further comprising:
    providing, by the first device, a service to the client device whenever the first device is subsequently operatively re-coupled to the client device.

4. The method of claim 1, wherein:
the first device comprises a storage drive; and
the mass storage interface on the first device is configured to enumerate, to the client device, the storage drive as a virtual storage drive, wherein the virtual storage drive includes an installer program configured to install the device driver in the client device.

5. The method of claim 4, wherein said installing a device driver comprises:
installing the device driver in response to the client device auto-launching the installer program.

6. The method of claim 5, further comprising:
preventing detection of the virtual storage drive by the client device upon operatively re-coupling the device to the client device.

7. The method of claim 1, wherein the first device comprises a printing device, a fax machine, a copier, a scanner, a webcam, a camera, or a television.

8. A service device comprising:
a processor configured to detect a universal serial bus (USB) operating system (OS) descriptor request made by a client device upon coupling the service device to the client device via a USB link, the processor being further configured to report a mass storage interface in response to detecting the USB OS descriptor request;
a storage drive storing
an installer program, and
a device driver;
the mass storage interface, wherein the mass storage interface is configured to enumerate the storage drive to the client device in response to the device being initially coupled to the client device for a first time;
wherein the installer program is configured to
execute in response to the storage drive being enumerated, detected and auto-launched by the client device,
install the device driver in the client device in response to being auto-launched,
operatively de-couple the service device from the client device after installation of the device driver, and
operatively re-couple the service device to the client device,
wherein the processor is further configured to, in response to a lack of a USB OS descriptor request from the client device to the service device subsequent to operatively re-coupling the service device to the client device, report all interfaces, other than the mass storage interface, of the service device to the client device.

9. The device of claim 8, wherein the installer program is further configured to prevent detection of the storage drive by the client device upon operatively re-coupling the service device to the client device.

10. The device of claim 8, wherein the mass storage interface is configured to enumerate the storage drive to the client device as a virtual storage drive in the service device.

11. The device of claim 8, wherein the service device comprises a printing device, a fax machine, a copier, a scanner, a webcam, a camera, or a television.

12. A method comprising:
coupling a client device to a service device via a universal serial bus (USB) link;
first enumerating, by the client device, the service device, the first enumerating comprising (i) requesting, by the client device, any USB operating system (OS) descriptors from the service device and (ii) creating, by the client device, a unique registry entry within the OS of the client device for the service device;
detecting, by the client device during the first enumerating, a mass storage interface from the service device in response to requesting the USB OS descriptors;
detecting, by the client device via the mass storage interface, a presence of a storage drive in the service device;
executing, by the client device, an auto-play program configured to auto-launch an installer program in the storage drive thereby causing the installer program to install a device driver in the client device;
subsequent to device driver being installed in the client device, operatively de-coupling the client device from the service device;
subsequent to operatively de-coupling the client device from the service device, operatively re-coupling the client device to the service device;
subsequent to operatively re-coupling the client device to the service device, second enumerating, by the client device, the service device, wherein during the second enumerating, the client device refrains from requesting any USB OS descriptors from the service device; and
in response to refraining from requesting any USB OS descriptors from the service device, detecting, by the client device during the second enumerating, all interfaces of the service device other than the mass storage interface.

13. The method of claim 12, further comprising:
preventing, during the second enumerating, execution of the auto-play program.

* * * * *